United States Patent

[11] 3,559,807

| [72] | Inventor | Bertram B. Reilly<br>17 Briar Cliff Road, Pittsburgh, Pa. 15202 |
|---|---|---|
| [21] | Appl. No. | 836,738 |
| [22] | Filed | June 26, 1969 |
| [45] | Patented | Feb. 2, 1971 |

[54] SEWAGE TREATING APPARATUS AND METHOD
10 Claims, 6 Drawing Figs.

[52] U.S. Cl. .................................................. 210/68,
210/152, 210/387
[51] Int. Cl. ...................................................... B01d 25/34,
B01d 33/36
[50] Field of Search .......................................... 210/152,
179, 68, 387, 67, 10

[56] References Cited
UNITED STATES PATENTS

| 2,026,969 | 1/1936 | Flynn | 210/67X |
| 2,096,176 | 10/1937 | Harrington | 210/152X |
| 2,730,933 | 1/1956 | Reynolds | 210/68X |
| 2,736,434 | 2/1956 | Yacoe | 210/387X |
| 3,138,088 | 6/1964 | Foth | 210/67X |

Primary Examiner—Samih N. Zaharna
Attorney—Parmelle, Utzler & Welsh

ABSTRACT: A method and apparatus for separating and drying sewage sludge by filtering an aqueous slurry of sludge through a filter medium on a travelling foraminous conveyor to deposite a layer of sludge on the filter medium and passing the conveyor and filter medium with a sludge deposit through a drying chamber where the sludge is dried by downdraft flow of hot gases and the filter medium and sludge deposit subsequently removed from the conveyor and the conveyor returned for application of fresh filter medium and recycle. Preferably the filter medium and sludge are removed from the conveyor by passage through a furnace where they are burned and the resulting hot combustion gases fed to the drying chamber.

INVENTOR.
Bertram B. Reilly.
BY Parmelee, Utzler & Welsh
Attorneys.

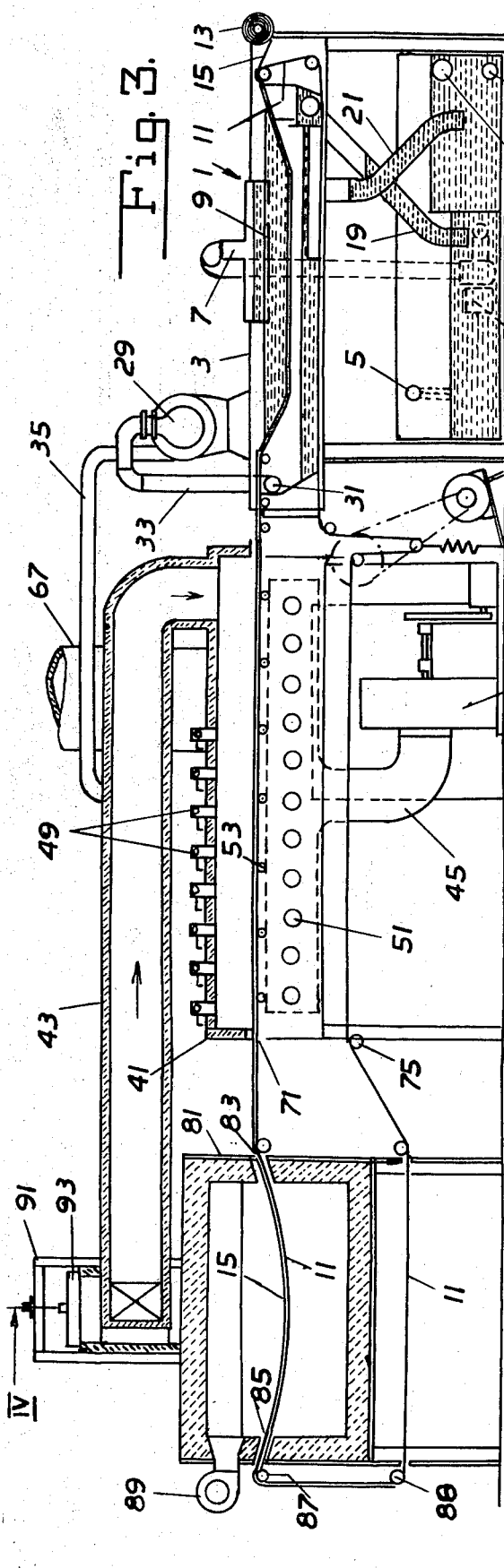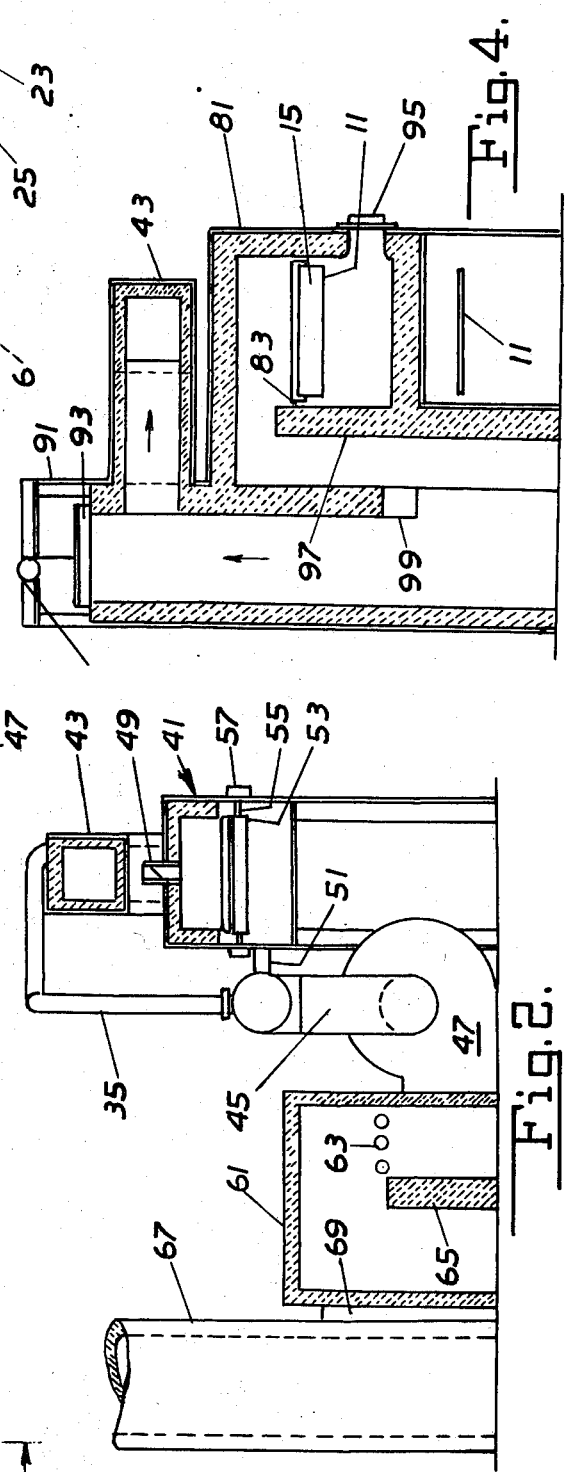

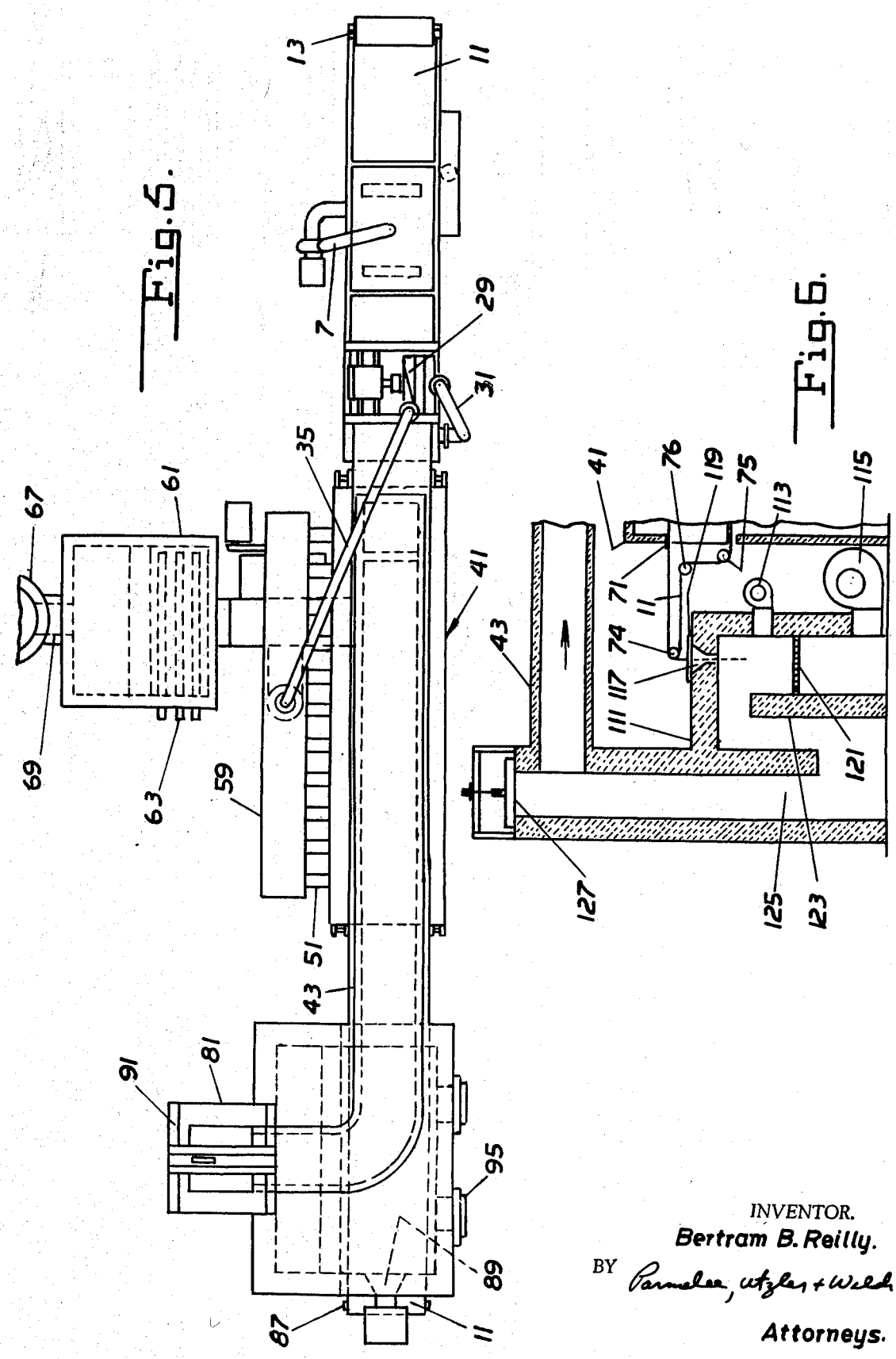

3,559,807

SEWAGE TREATING APPARATUS AND METHOD

BACKGROUND OF THE INVENTION

The sludge derived either as a residue from the settling tanks of sewage treatment plants or a product collected from septic tanks, poses severe disposal problems and problems of transformation of it into an unobjectionable state. The sludge, usually in the form of an aqueous slurry is difficult to handle because of its noxious character and numerous disposal methods have been proposed. One such method is described in U.S. Pat. No. 2,096,176 to Harrington, where the sludge is subjected to vacuum filtration on a vacuum drum to produce a yeastlike precipitate, the precipitate transferred to a conveyor passing through a drying unit, where hot gases are forced upwardly through the yeastlike precipitate, and then to a furnace where it is burned. Such a process, in addition to involving problems resulting from the need to transfer the yeastlike material from the drum filter to the conveyor in the drier, results in the contamination of the working parts of the conveyor by the material and the danger of damage to the conveyor. In addition to fouling of the conveyor system, the forcing of air upwardly through the yeastlike material creates a dust problem because, as it dries, some of it is carried off by the hot gases, thereby contaminating the surrounding air and environment.

I have discovered a process and apparatus for the continuous, efficient and economical separating and drying of sewage sludge, where sludge is continuously separated on a disposable filter medium, with the elimination of the dust or fouling of the surrounding area.

SUMMARY OF THE INVENTION

The present invention for separating and drying sewage sludge includes a filter unit comprising a tank having means for charging an aqueous sludge slurry at the upper portion and means for discharging filtrate from the lower portion. A foraminous conveyor means is provided with means for feeding the conveyor through the upper portion of the tank and means for applying a continuous filter medium to the conveyor. A drying chamber having means for introducing hot gases at the upper region in downdraft flow and discharging gases at the lower region is adjacent the tank. Feed means are provided to pass the conveyor through the filter unit where a deposit of sludge is formed on the continuous filter medium and through the dryer where the now dewatered sludge is dried by downdraft hot gases. Removal means are then provided to remove the filter medium and dried sludge from the conveyor along with the recycle of the foraminous conveyor to the conveyor feed means of the filter unit. Preferably, the filter medium and dried sludge are removed from the conveyor by combustion in a furnace with means being provided for feeding the conveyor through the furnace and passing hot gases from the combustion to the drying chamber.

According to the present method an aqueous sewage sludge slurry is continuously filtered through a continuous filter medium carried by a travelling foraminous conveyor with filtrate being removed and sludge deposit formed on the filter medium. The filter medium, with its deposit, is carried through a heated gaseous downdraft by the conveyor and the dried sludge and filter medium removed from the conveyor and disposed of, preferably by passage through a furnace where the dried sludge and filter medium are burned while still being carried by the foraminous conveyor.

BRIEF DESCRIPTION OF THE DRAWINGS

FIG. 2 is a view taken along the plane of lines II–II of FIG. 1;

FIG. 3 is a sectional elevational view of the apparatus having a furnace for removal of the filter medium and deposit, showing passage of hot combustion gases from the furnace to the drier;

FIG. 4 is a view taken along the plane of lines IV–IV of FIG. 3;

FIG. 5 is a top plan view of the apparatus shown in FIG. 3; and

FIG. 6 is a sectional view of another embodiment of the present invention using a furnace where deposit and filter medium are consumed and hot combustion gases fed to the drier.

DETAILED DESCRIPTION

Figure 1:
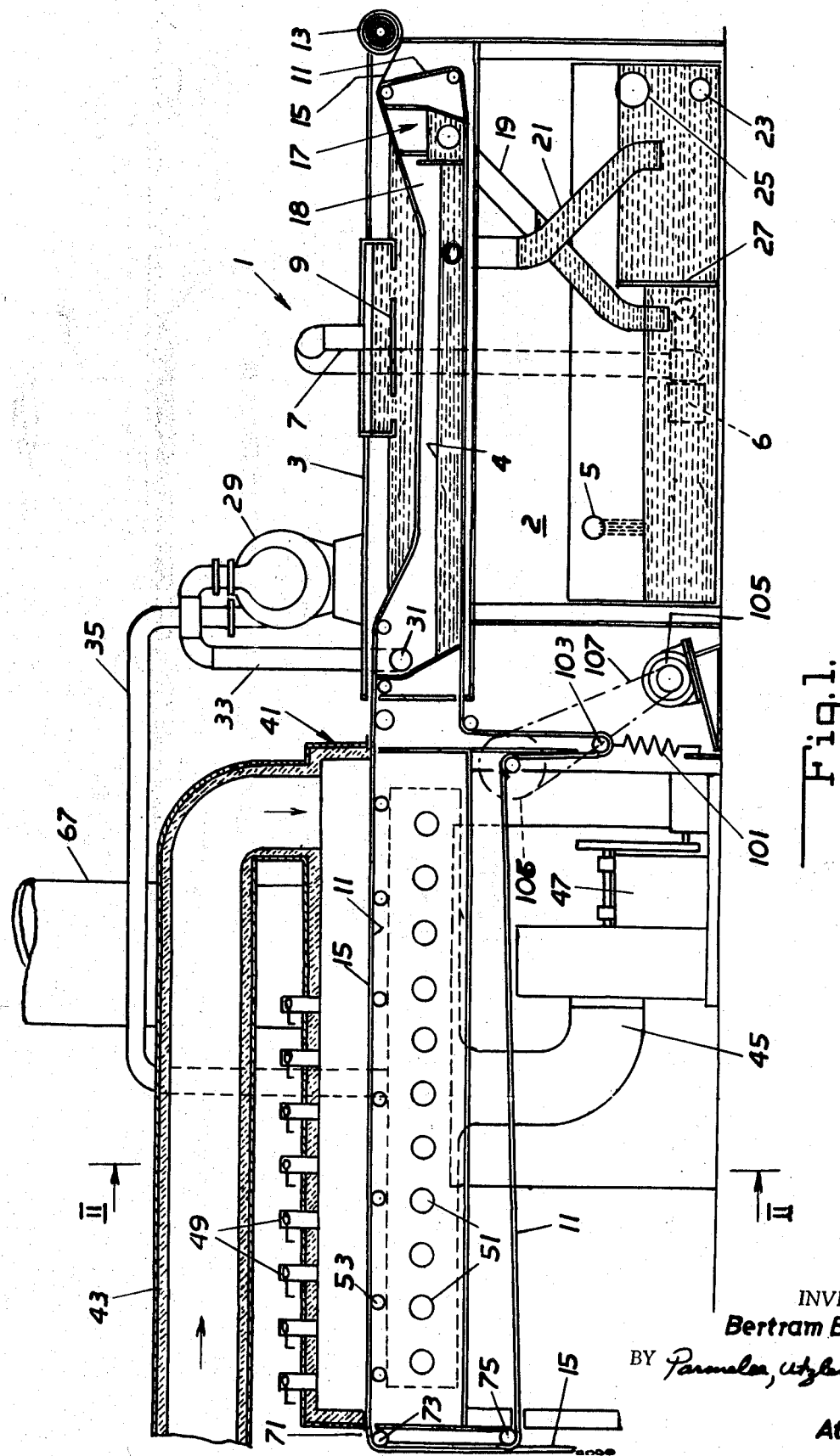
FIG. 1 is sectional elevational view of the apparatus for separating and drying sewage sludge of the present invention.

Referring to FIG. 1, there is illustrated a filter unit 1, comprising a tank 3, having an aqueous sludge slurry inlet port 5, a pump 6 and a delivery line 7 in the lower portions 2 thereof for feeding of slurry to be filtered to the upper portion 4 of the filter unit. A weir or distributing means 9 is preferably provided to distribute the entering sludge to a larger area of the upper portion 4 of the filter unit. Passing through portion 4 of the tank is the top reach of an endless foraminous conveyor means 11 such as a continuous chain or metal mesh belt which passes from right to left as illustrated in FIG. 1. Laid over the top surface of said reach of the foraminous conveyor prior to contact with any aqueous slurry, from a roll 13, is a disposable filter medium 15 such as paper, cloth, or the like of any desired porosity or thickness, which covers the upper surface of conveyor 11 in its passage through the upper portion 4 of tank 3. Tank 3 may also have a prewetting section 17 where the initial slurry contacting the filter medium 15 carried by conveyor 11 will be returned to the slurry in the lower portion 2 of tank 3 by means of return line 19, this initially contacting filtrate being less completely filtered than the filtrate passing through a wet filter medium after an initial deposit has been formed thereon. Filtrate passing through filter medium 15 carried by conveyor 11 in the main filtering region 18 of the upper portion 4 of tank 3 is removed by line 21 to a reservoir in the lower portion 2 in which has a wall 27 and may be discharged through port 23. An overflow port 25 is also provided for the reservoir.

When a vacuum is to be used to increase the rate of filtering through the filter medium 15 and foraminous conveyor 11, a vacuum port 31, vacuum line 33 and vacuum means such as exhaust pump 29 are provided, which will draw a partial vacuum and maintain a subatmospheric pressure in the region of upper portion 4 below the conveyor 11. A discharge line 35 is provided to exhaust the air and fumes discharged by the pump 29. Structures of the general type useful as filtering units in my apparatus are disclosed in U.S. Pat. No. 2,983,383 to C. A. Wallace, et al., granted May 9, 1961, and improvements thereon described in U.S. Pat. Nos. 3,333,705 granted Aug. 1, 1967, to W. J. Lee, and 3,358,834 granted Dec. 19, 1967, to A. M. El-Hindi.

From the filter unit 1, the top reach of the foraminous conveyor 11 passes into drying unit 41 with rollers 53 or other support means provided to support the weight of the conveyor 11 with the filter medium 15 and its burden of wet but dewatered sludge. The dryer 41 has a hot air or other hot gas inlet duct 43 through which hot gases are introduced into the upper region 41 above the conveyor for downdraft passage through the deposit, filter medium 15 and foraminous conveyor 11 (the gas source not shown in FIG. 1). Exhaust lines 51, below the conveyor 11 are connected to a manifold 59 and line 45 connected to an induced draft fan 47 for drawing the hot gases downwardly through the conveyor 11. Air bleed valves 49 may be used to adjust the flow or temperature of the hot gases through the dryer by admission of air, if desired. As shown in FIG. 2, the hot gases exiting from dryer 41 by means of exhaust fan 47 pass to an afterburner 61 where fuel burners 63 are provided to consume the volatile material and offensive gases from the sludge deposit. A divider 65 is preferably used to separate the afterburner into two chamber, while gases, following passage through the afterburner 61, are passed by conduit 69 to a stack 67 from which they are discharged.

The conveyor 11, passing through dryer 41 is supported by rollers 53, the rollers having a shaft 55 which passes through the wall of the dryer and has an external bearing 57 to provide a seal for the wall with working parts of the roller being removed from the hot gaseous atmosphere of the dryer. The upper reach of the conveyor 11, now carrying the filter medium 15 and the dried sludge leaves the drying chamber through exit slot 71 and is directed downwardly by roller 73, exteriorly of the dryer 41. The conveyor 11 is then directed for return to the filter unit 1 by means of roller 75. Prior to return to the filter unit 1, the dried deposit and dried filter medium 15 are removed from the foraminous conveyor, either due to the gravitational effect caused by the downward movement and change in direction by roller 75 or by a suitable scraper, air jet or other means.

Means are provided for tension on the conveyor 11 and movement thereof in a continuous cycle, herein illustrated as a tension spring 101 attached to an idler roller 103. There is a drive means or motor 105 operatively attached to wheel 106 by belt 107 to operate the conveyor 11. Other means can of course be provided for tensioning and to effect the travel of the conveyor 11 and such means may be positioned elsewhere in the general layout of the apparatus as would be known to one skilled in the art.

An especially useful means for removal of the dried sludge deposit and filter medium 15 from the conveyor 11 is shown in FIG. 3. Following passage through the drier 41, the conveyor 11 carrying the dried deposit and filter medium 15 is passed through a furnace 81, entering through a slot 83. The dried deposit and filter medium are burned off the conveyor 11 by means of a burner 89 and the conveyor 11 leave the furnace 81 through exit slot 85, and the direction of the conveyor reversed by means of rollers 87 and 88 to direct its return back to the filter unit 1. A clean-out door 95 (FIG. 4) is provided on the furnace 81 for removal of ashes.

The hot combustion gases discharged from furnace 81 pass over dividing wall 97 and into stack 99, having an emergency relief damper 93 situated on the top portion 91, and enter hot gas inlet duct 43 of the drier 41 for use in drying the sludge deposit as it is carried through the drier.

A further embodiment is illustrated in FIG. 6, wherein the conveyor 11, carrying dried deposit and filter medium from the drier is directed is directed around a roller 74 positioned above a charging port 117 in a furnace 111. The dried deposit and filter medium are stripped from the conveyor by gravity or scraper means and discharged through an opening in cover plate 119 through port 117 and onto grate 121 where it is burned by means of burner 113 in conjunction with forced air means 115. Such furnace would preferably be operated at less than atmospheric pressure using an induced draft fan or the like so that outside air is drawn into the furnace and aids in the combustion process. The hot combustion gases are passed over divider 123 and into stack 125 having emergency damper means 127 thereon and then directed into gas inlet duct 43 of the drier 41 for use in drying the wet deposits passing through the dryer as above described. The conveyor 11, after discharging of the deposit and filter medium into the furnace, travels in a return pass to the filter unit 1.

The method for separating and drying of sludge according to the present invention involves feeding an aqueous sludge slurry to the filter unit, and continuously filtering the slurry through a filter medium carried by a foraminous continuous conveyor and withdrawing the filtrate from the filter unit. The slurry may be raw sewage or a partially dewatered concentrate, such as that drained from treating plants or septic tanks. Filtration of the slurry will result in the deposition of a dewatered sludge deposit on the filter medium which, with the filter medium, is carried through the filter unit, withdrawn therefrom and passed into the drier. The deposit, carried by the filter medium on the foraminous conveyor is then dried by downdraft passage of hot gases therethrough. The hot gases are drawn through the sludge and filter medium by an induced draft fan, provision for a tight seal at the edges of the belt effected by a guide shoe or strip seal applied to the upper side of the edges of the belt, or, the downdraft force due to the suction of the fan can provide an adequate seal. By maintaining a relatively shallow thickness of sludge deposit on the filter medium carried by the conveyor, very rapid drying results. The shallow layer of sludge also permits intimate and thorough contact of the hot gases and wet sludge. The hot gases drawn through the sludge deposit, filter medium and foraminous conveyor are cooled and moistened thereby and withdrawn from the lower portion of the dryer by the induced draft fan for discharge through a stack. The downdraft flow reduces the tendency for dried material to be carried in the exhaust gas stream as dust, while the sludge and filter medium in combination act as a filter to trap any dust particles carried with the hot gases fed to the upper portion of the drier through the hot gas inlet duct. The downdraft also protects the conveyor from extended exposure to the hot gases in the drier. As explained above, the afterburners are provided intermediate the fan and stack to destroy any volatile, odoriferous components that result from the drying of the sludge and the subsequent burning thereof. The discharge from the air exhauster on the vacuum filter unit is also connected to the induced draft fan suction so that odoriferous material contained in the air from the filter are also consumed by the afterburners.

Following passage through a drier and drying of the sludge, the combined dried sludge and filter medium are removed from the foraminous conveyor and may be disposed of in a conventional manner, while the conveyor is returned for application of fresh filter medium thereto and use in further filtering of aqueous sludge slurry. The dried sludge and filter medium can be deposited in a furnace, with hot combustion gases fed to the drier for a subsequent drying operation. Or, the removal of the dried sludge and filter medium can be achieved by burning off both materials from the conveyor in a furnace. The hot gases from such combustion are readily returned to the upper portion of the drier for passage through subsequent sludge and filter medium to dry the same.

I claim:

1. Sewage processing apparatus comprising:
    a. a foraminous endless conveyor having upper and lower reaches and means for continuously driving the conveyor in one direction;
    b. a horizontally-extending filter unit through which one reach of the conveyor extends from adjacent one end of the unit to the adjacent other end thereof;
    c. means in advance of the filter unit for continuously applying a preformed expendable filter web to the top surface of said reach of the traveling conveyor to be carried along on and by the conveyor into and through the filter unit;
    d. means for discharging sewage to be processed into the said web within filter unit while liquid in the sewage passes through the web and through the foraminous conveyor on which the web is supported and the solids are deposited on said web;
    e. a horizontally-elongated drier following the filter unit through which said reach of the foraminous conveyor passes while said web and the solids which have collected thereon are carried along with the conveyor, the drier having means for forcing drying gases downwardly through the deposited solids on the web and the foraminous conveyor whereby the solids and filtering web are pressed by said gases against the conveyor without disruption or disturbance of the solids in the drier; and
    f. means located in the direction of travel of the conveyor after the drier for disposing of the filtering web and dried solids.

2. Sewage processing apparatus as defined in claim 1 wherein the foraminous conveyor is so arranged and supported within the filtering unit as to retain a pool of sewage on the conveyor and its overlying web of filtering material in the area between the two ends of the filtering unit.

3. Sewage processing apparatus as defined in claim 2 wherein the end portions of the foraminous conveyor adjacent the two ends of the filtering unit are higher than the intervening span of the conveyor to provide said pool.

4. Sewage processing means as defined in claim 1 wherein the filtering unit has means for maintaining a subatmospheric pressure therein below the conveyor to accelerate the flow of liquid through the web and conveyor while they are passing through the filtering unit.

5. Filtering apparatus as defined in claim 1 wherein the filtering unit has an elongated liquid receiving means under the conveyor, for receiving the liquid that passes through the web and conveyor, said liquid receiving means having a transverse divider spaced from the ends thereof whereby the liquid which passes through the filtering web and conveyor at the entering end of the filtering unit is separated from the other liquid that passes through the web and conveyor beyond said divider, and means for recycling the liquid so collected from under the entering end of the conveyor to the input sewage.

6. Sewage treating apparatus as defined in claim 1 wherein there is a combustion apparatus following the drier in which the expendable filtering medium and dried deposit carried thereby are burned.

7. Sewage treating apparatus as defined in claim 6 wherein hot gases generated in said combustion apparatus are circulated to the drier to flow down through the material on the web and through the web and the conveyor, there being means under the conveyor for collecting and exhausting said gases after they have passed through the solids, the web and the conveyor.

8. A sewage disposal method comprising:
 a. continuously applying a continuous web of unused expendable filtering medium to an endless traveling foraminous conveyor;
 b. continuously flowing the sewage to be processed as an aqueous slurry onto said web and removing most of the water phase through the web and supporting conveyor while depositing a layer of sludge on the web;
 c. continuously thereafter forcing hot drying gases downwardly through the layer of sludge, the web, and the foraminous conveyor to dry the sludge;
 d. continuously burning the web and sludge and returning the foraminous conveyor free of all deposit to a position to receive the web; and
 e. utilizing heat from burning the web and sludge for effecting the downdraft drying of the sludge and wedge.

9. The sewage disposal method comprising:
 a. separating the solids from an aqueous slurry on a continuous filter web of expendable material while the web is supported on and carried with a traveling foraminous conveyor;
 b. thereafter forcing hot drying gases downdraft through the traveling conveyor and the web and solids carried thereby;
 c. burning the filtering web and solids thereon following the drying step and utilizing the heat of combustion to tp provide hot gases for the drying step; and
 d. returning the foraminous conveyor free of the web and solids to receive a fresh filtering web.

10. A method as defined in claim 9 wherein the dried sludge and filtering web are burned in a furnace enclosure while said filtering web and the dried sludge thereon are still supported on the foraminous conveyor.